United States Patent
Marr et al.

(10) Patent No.: US 9,354,997 B2
(45) Date of Patent: May 31, 2016

(54) AUTOMATIC TESTING AND REMEDIATION BASED ON CONFIDENCE INDICATORS

(71) Applicant: Amazon Technologies, Inc., Seattle, WA (US)

(72) Inventors: Michael David Marr, Monroe, WA (US); Matthew D. Klein, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/666,081

(22) Filed: Mar. 23, 2015

(65) Prior Publication Data

US 2015/0269048 A1    Sep. 24, 2015

Related U.S. Application Data

(63) Continuation of application No. 13/485,581, filed on May 31, 2012, now Pat. No. 8,990,639.

(51) Int. Cl.
| | |
|---|---|
| *H04L 12/26* | (2006.01) |
| *G06F 11/26* | (2006.01) |
| *G06F 11/30* | (2006.01) |
| *G06F 11/07* | (2006.01) |
| *G06F 11/36* | (2006.01) |

(52) U.S. Cl.
CPC ............ *G06F 11/26* (2013.01); *G06F 11/0793* (2013.01); *G06F 11/30* (2013.01); *H04L 12/2602* (2013.01); *G06F 11/3672* (2013.01); *G06F 11/3692* (2013.01); *H04L 12/26* (2013.01)

(58) Field of Classification Search
CPC ............ G06F 11/0751; G06F 11/0766; G06F 11/3692; G06F 11/3672; H04L 12/26; H04L 12/2602; G01R 31/317; G01R 31/31707; G01R 31/2851; G01R 31/2896

See application file for complete search history.

(56) References Cited

U.S. PATENT DOCUMENTS

| | | | |
|---|---|---|---|
| 5,130,936 A | * | 7/1992 | Sheppard ............ G06F 11/2257 128/925 |
| 5,815,654 A | | 9/1998 | Bieda |
| 6,029,257 A | | 2/2000 | Palmer |
| 6,128,753 A | | 10/2000 | Keeble et al. |
| 6,557,120 B1 | | 4/2003 | Nicholson et al. |
| 7,149,657 B2 | | 12/2006 | Goebel et al. |
| 7,246,271 B2 | * | 7/2007 | Manley ............... G06F 11/2257 714/47.3 |
| 7,308,331 B2 | | 12/2007 | Bjornson |

(Continued)

OTHER PUBLICATIONS

U.S. Appl. No. 13/485,607, filed May 31, 2012, Marr et al.

(Continued)

*Primary Examiner* — Joseph Schell
(74) *Attorney, Agent, or Firm* — Knobbe, Martens, Olson & Bear, LLP

(57) ABSTRACT

An asset health monitoring system (AHMS) can assign a confidence indicator to some or all the monitored computing asset in a data center, such as computing systems or networking devices. In response to drops in the confidence indicators, the AHMS can automatically initiate testing of computing assets in order to raise confidence that the asset will perform correctly. Further, the AHMS can automatically initiate remediation procedures for computing assets that fail the confidence testing. By automatically triggering testing of assets and/or remediation procedures, the AHMS can increase reliability for the data center by preemptively identifying problems.

20 Claims, 9 Drawing Sheets

(56) References Cited

U.S. PATENT DOCUMENTS

| | | | |
|---|---|---|---|
| 7,356,432 B1* | 4/2008 | Lang | G06F 11/263 702/117 |
| 7,539,907 B1 | 5/2009 | Johnsen et al. | |
| 7,580,811 B2 | 8/2009 | Belden | |
| 7,602,885 B2 | 10/2009 | Afzal et al. | |
| 7,634,682 B2 | 12/2009 | Black et al. | |
| 7,747,987 B1* | 6/2010 | Akarte | G06F 11/3688 702/179 |
| 7,873,732 B2 | 1/2011 | Chen et al. | |
| 8,627,149 B2 | 1/2014 | Anerousis et al. | |
| 9,106,661 B1* | 8/2015 | Stamos | H04L 63/10 |
| 2002/0174384 A1 | 11/2002 | Graichen et al. | |
| 2003/0033093 A1* | 2/2003 | Nelson | G06F 17/50 702/34 |
| 2003/0118029 A1 | 6/2003 | Maher et al. | |
| 2005/0222813 A1 | 10/2005 | Bjornson | |
| 2006/0129870 A1 | 6/2006 | Parent et al. | |
| 2006/0253588 A1 | 11/2006 | Gao et al. | |
| 2007/0094542 A1* | 4/2007 | Bartucca | G06F 11/3672 714/38.1 |
| 2007/0226546 A1 | 9/2007 | Asthana et al. | |
| 2009/0006597 A1 | 1/2009 | Bade et al. | |
| 2009/0249115 A1 | 10/2009 | Bycroft et al. | |
| 2010/0211669 A1 | 8/2010 | Dalgas et al. | |
| 2010/0274789 A1 | 10/2010 | Grace et al. | |
| 2011/0224946 A1 | 9/2011 | Brayman | |
| 2012/0221283 A1* | 8/2012 | Lee | G06F 11/3676 702/119 |
| 2013/0287183 A1 | 10/2013 | Ren | |

OTHER PUBLICATIONS

U.S. Appl. No. 13/485,515, filed May 31, 2012, Marr et al.

Finite State Machines (FSM) by Jason Brownlee retrieved by Google Oct. 1, 2002 (http://ai-depot.com/FiniteStateMachines/FSM-Background.html Test While You Sleep (and over Weekends) by Rajith Attapattu, Nov. 26, 2009 (http://programmer.97things.oreilly.com/wiki/index/php/Test_While_YOu_Sleep(and_over_Weekends).

* cited by examiner

AUTOMATIC TESTING AND REMEDIATION BASED ON CONFIDENCE INDICATORS

CROSS-REFERENCE TO RELATED APPLICATION

This application is a continuation of U.S. patent application Ser. No. 13/485,581, entitled AUTOMATIC TESTING AND REMEDIATION BASED ON CONFIDENCE INDICATORS, and filed May 31, 2012, the entirety of which is incorporated herein by reference.

BACKGROUND

With the introduction of virtualization technology, a computing service provider can now provide computing resources or services to customers dynamically or in a scalable manner. As the computing resource demands of the customer increase, the computing service provider can allocate additional computing resources. Such resources can be provided to the customer as part of a virtual network connectable to the customer's own physical network. These computing resources can be provided to a customer transparently, without the customer's knowledge of where on an associated physical network such a resource exists. However, these computing resources may be represented to the customer as virtual components, such that the customer has the illusion of having sole access to the computing resources.

Generally, the customer is provided with a virtual machine instance that provides computing resources. Typically, the virtual machine instance functions as a virtual computing server that operates on a physical computing node. Typically, there are multiple virtual machine instances allocated on each physical computing node. The physical computing nodes can be grouped into computing networks in a data center. The data center can include hundreds, thousands, or tens of thousands of computing nodes. The computing service provider can operate multiple data centers at multiple geographical locations.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION OF SPECIFIC EMBODIMENTS

Overview

Figure 1:
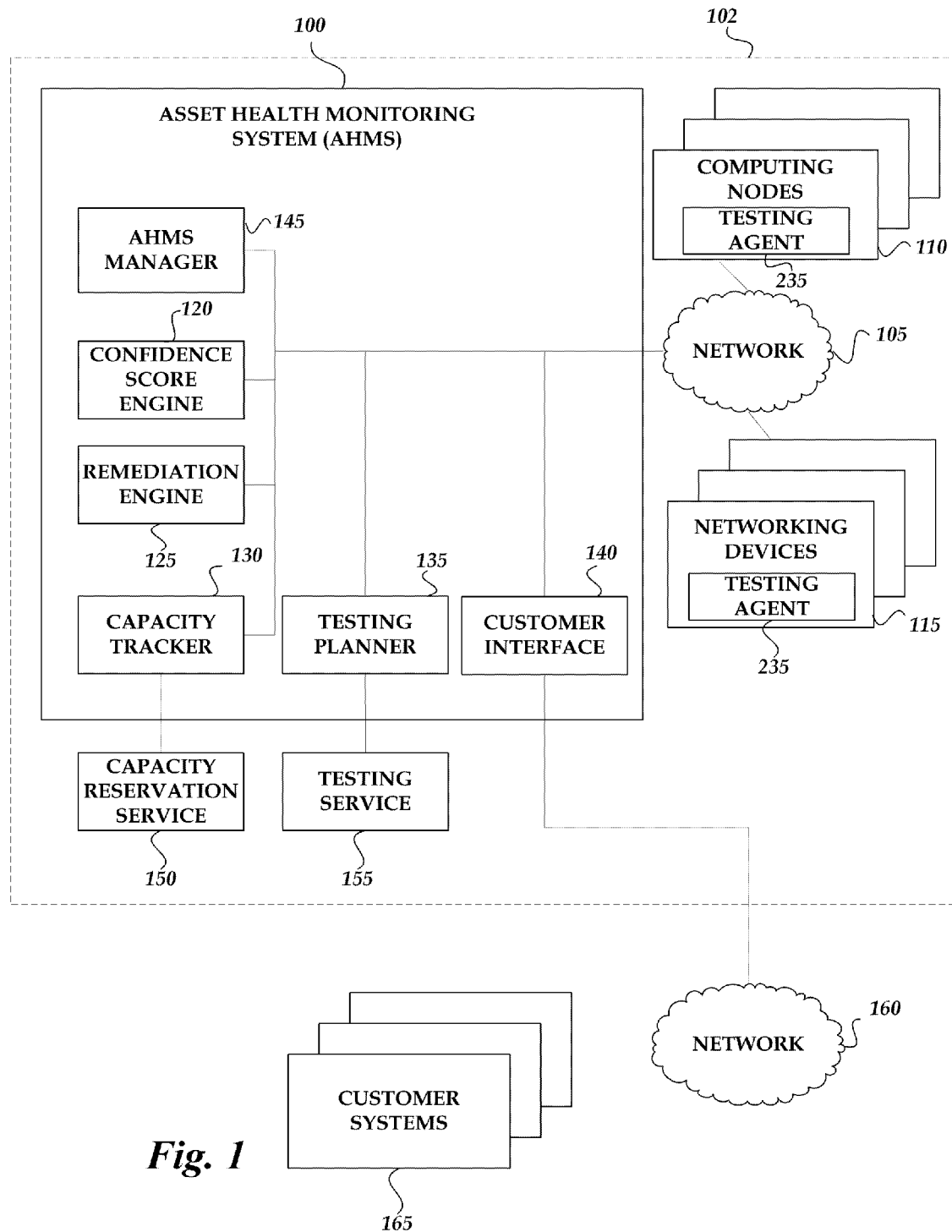
FIG. 1 is a network diagram schematically illustrating an example embodiment of an asset health monitoring system that monitors health of computing assets.

A data center can be a facility that houses computing assets, including computer systems and associated components such as telecommunications and storage systems. Data centers generally include redundant or backup power supplies, redundant data communications connections, environmental controls (e.g., air conditioning, fire suppression) and security devices. As computing resource demands increase, the data center operator adds new computing assets and/or replaces aging data center equipment with newer computing assets that provide increased capacity and performance. In addition, some computing assets may develop operating problems, stop working, or become unstable, necessitating the replacement of those computing assets. With typically frequent changes in the makeup of a data center, there is a need for providing automated methods and systems for testing and/or monitoring the health of the computing assets in data centers or other computing resource facilities.

Embodiments of an asset health monitoring system ("AHMS 100") are described below. In one embodiment, the asset health monitoring system 100 operates in a data center or other computing resource facility and monitors the health of the computing assets in the data center. The computing assets can be used by a computing resource provider to provide computing services to its customers. The asset health monitoring system 100 can be scaled up or down depending on the needs of the computing resource provider. For example, the asset health monitoring system 100 may monitor multiple data centers or may monitor a portion of a data center.

In some embodiments, the asset health monitoring system 100 assigns a confidence score or other indicator to some or all of the monitored computing assets, such as computing systems or networking devices. In one embodiment, the confidence score is a value that corresponds to the expected reliability of the computing resource. A higher confidence score can indicate a more reliable computing resource. The asset health monitoring system 100 generates and/or modifies the confidence score for the computing resources. In some embodiments, the confidence score decreases as a function of time or as a result of problems or events during operation of the computing asset. In some embodiments, the confidence score can be a single value or multiple values. For example, a single value can be used to denote to the overall health of the asset while sub-values or an array of values can be used to denote the health of sub-systems (e.g., processor, memory, network, etc.). In some embodiments, the asset health monitoring system 100 also monitors computing services and/or assigns confidence scores to such services.

In one embodiment, if the confidence score drops below a target threshold, the asset health monitoring system 100 can automatically initiate testing of the computing asset. In one embodiment, the asset health monitoring system 100 selects tests to perform based on the history of the asset and/or the resource constraints of the data center. For example, if additional computing resources are needed soon in the data center, the asset health monitoring system 100 may select a short test. Alternatively, if additional time is available, the asset health monitoring system 100 may select a longer, more thorough test. The asset health monitoring system 100 can then modify the confidence score of the computing asset based on the results of the testing. Longer tests and/or more thorough tests can result in a higher confidence score as the longer tests can provide a higher certainty that the asset is working correctly. For example, passing a short test may increase the confidence score by x while passing a longer test may increase the confidence score by 5x or 10x. The testing can be performed by the system 100 or by an external or different entity.

In some embodiments, the asset health monitoring system 100 may automatically initiate remediation procedures based at least partly on the confidence score. Such remediation procedures can include: generating work orders to conduct repairs (e.g., rebuilding servers, fixing environmental problems such as high temperatures, replacing computer parts, etc.); designating a device as a "lemon" or otherwise designating a device for replacement or deactivation, ordering replacement parts or devices (e.g., for lemon devices); transferring work from one computing asset to one or more other computing assets (e.g., by transferring one or more jobs or tasks, by deactivating an asset and activating a backup asset, by adding additional computing assets to a service to increase available computing resources, by rerouting network traffic, or by otherwise replacing or supplementing existing functionality), combinations of the same or the like. The remediation procedures can be performed by the system 100 or by an external or different entity, such as an entity owned or operated by a separate entity than the entity that operates the system 100.

By monitoring the health of the computing assets, the asset health monitoring system 100 can estimate the overall health of the data center as well as estimate the reliability of services provided to individual customers. In one embodiment, the asset health monitoring system 100 can use the confidence score to better fulfill service level agreements (SLAs) with its customers. For example, customers who need high reliability can be provided computing resources with high confidence scores. In one embodiment, the service provider can allow customers to select computing assets based on confidence scores, but may charge a premium for allocating computing assets with higher confidence scores. In one embodiment, the service provider can provide tiers of services (e.g., bronze, silver, gold, etc.) that correspond to estimated up-times (or other reliability metrics) by sorting computing assets into those tiers based on their confidence scores.

Furthermore, the asset health monitoring system 100 can use the confidence score to automatically trigger testing of assets and/or remediation procedures, likely resulting in increased reliability for the data center. Rather than waiting for breakdowns or problems to arise, the asset health monitoring system 100 can allow an operator to proactively identify and remedy issues before they cause problems.

In some situations, the data center operator can use the asset health monitoring to automatically narrow down suspected problem assets and/or automatically initiate remediation procedures for suspect assets. In an example scenario, the system 100 may receive an error report (e.g., a customer complaint or error logs from computing assets) that identifies a problem but does not identify a cause of the problem. In some cases, the system 100 can identify a set of suspect assets (e.g., based on confidence scores or the error reports) but not a specific problem asset. For example, reports from network devices can indicate that an unknown problem computing asset on a sub-network is corrupting data packets but the reports may not specifically pinpoint the problem asset. Rather than having a system administrator or other operator try to manually identify the unknown problem asset from the group of suspect assets, the system 100 can cause the confidence scores of the group of suspect assets to drop. In response, embodiments of the asset health monitoring system 100 then initiate automatic testing of the group of assets. In one embodiment, the system 100 includes an administrative interface or other tool allowing an operator to trigger automated testing by dropping the confidence scores. The group of assets can then be sorted into those that passed the tests and those that failed the tests, narrowing down the suspected problem assets. For those assets which failed the testing, remediation procedures can then be taken.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

Examples of an Asset Health Monitoring System

FIG. 1 is a network diagram schematically illustrating an example of an asset health monitoring system 100 that monitors the health of computing assets and/or computing services. In one embodiment, the asset health monitoring system 100 operates on a data center 102 operated by a computing resource provider. The data center can be used to provide network-based services to customers of the computing resource provider, such as a storage service, a computing resource provisioning service, etc. The system 100 can monitor all (or some) of the assets in the data center. For large data centers, the system 100 may be monitoring 1,000, 10,000, or 100,000 or more computing assets.

In some embodiments, the asset health monitoring system 100 includes various components that are connected via a network 105, a system bus or other communications medium. In the illustrated figure, the asset health monitoring system 100 monitors computing nodes 110 (e.g., computing systems, storage systems, etc.), network devices 115 (e.g., routers, switches, hubs, network links), or other computing assets. In the illustrated embodiment, the system 100 includes; a confidence score engine 120 for generating confidence scores, a remediation engine 125 for initiation remediation procedures, a capacity tracker 130 for tracking resource constraints of the data center, a testing planner 135 for initiating testing procedures, a customer interface 140 for interactions with customers, and an AHMS manager 145 for managing the various components and storing various data used by the asset health monitoring system 100. In one embodiment, the system 100 includes testing agents 235 operating on one or more of the computing nodes or networking devices for obtaining test data. In one embodiment, one or more of the components operate on separate computing devices connected through the network 105. In one embodiment, one or more of the components operate on the same computing device.

In some embodiments, the capacity tracker is in communication with a capacity reservation service 150 that allocates computing resources to customers and the testing planner is in communication with a testing service 155. The capacity reservation service 150 and testing service 155 may be part of the asset health monitoring system 100 or may be external to the system 100. For example, capacity reservation service 150 and/or the testing service can be connected to the system 100 via a network. In one embodiment, the capacity reservation service 150 and testing service 155 are systems operating alongside the asset health monitoring system 100, such as in the same data center.

The asset health monitoring system 100 can be accessed by administrators and optionally connected via a network 160 to one or more customer systems 165. Customers can use the customer interface 140 (e.g., a web service, application program interface, message protocol or the like) to monitor the health of computing resources assigned to them. Customers may also be connected to other services provided by the computing resource provisioning service, such as the capacity reservation service 150. For example, customers may use the capacity reservation service 150 to request computing resources. The capacity reservation service 150 can aggregate and/or analyze customer requests to determine the overall resource constraints of the provisioning service. The capacity reservation system 150 (or other service) may also include data on the network topology of the data center. The capacity reservation system 150 can provide the topology data and/or the constraint data to the capacity tracker 130 so that the asset health monitoring system 100 can utilize that information in its decision making.

The asset health monitoring system 100 may also communicate with other services, such as an inventory service that maintains data on assets for the data center. Such data can include listings of active assets, inactive assets (e.g., assets unavailable due to testing or repair), ordered assets, and schedules for expected additions to the active assets (e.g., repair completion dates, new asset delivery dates, testing timelines, etc.).

The confidence score engine 120 can generate a confidence score for every (or some) computing asset of the data center. In some embodiments, the confidence score reflects an estimated probability of failure. The engine 120 can also track a computing asset's confidence score history, which can include all or some of the confidence scores assigned to an asset or a subset of all the past confidence scores (e.g., past 3-5 years or a user-selected time period).

In one embodiment, a confidence score is assigned to an asset when or after it is ingested or activated by the data center. For example, in response to a new computing asset first arriving at the data center, a confidence score can be generated for that computing asset. In one embodiment, an untested asset is given a confidence score of 0, which is then modified as a result of testing. In one embodiment, the asset health monitoring system 100 initiates testing of the asset and generates the confidence score based at least partly on the testing results. Other factors that could affect the confidence score include expected failure rates, brand or model of the asset, asset type, expected usage loads or the like.

In one embodiment, the confidence score engine 120 decays the score over time using a decay formula. The confidence score engine 120 can use a uniform decay formula and or can use multiple decay formulas. For example, different asset types may have different decay formulas, which can be based on the expected reliability of different assets. In one embodiment, confidence scores for assets with higher failure rates or lower mean time between failures (MTBF) may be decayed at a faster rate than assets that are less likely to have failures.

In one embodiment, the confidence score engine 120 reduces the confidence score based on usage events that occur with respect to the computing asset. Such usage events can include customer complaints (e.g., received from a customer or logged by a system operator or user), data center events (e.g., power surges, outages), data center environment conditions, error reports, variance in the operational characteristics of computing assets, reported failures, or detected failures. For example, a customer complaint for slow service can cause the confidence score engine 120 to lower the confidence score(s) of computing asset(s) being utilized by the customer. In another example, the system 100 can receive reports from computing assets and analyze the reports to identify problems such as bad connections, dropped packets or the like. The system 100 can then drop the confidence score(s) for asset(s) involved with the reported or detected failures.

In some embodiments, the confidence score engine 120 can verify or otherwise filter reports of usage events, such as customer complaints. In some cases, some customers may submit excessive customer complaints, either maliciously or mistakenly. In one embodiment, the confidence score engine 120 can analyze customer history to identify the reliability of customers. For example, a customer who files complaints where subsequent testing did not find any problems may be designated as unreliable while a customer whose complaints led to the identification of real problems may be designated as reliable. Other aspects of customer history, such as frequency, timing, payment history, or the like can also be used to determine reliability. In one embodiment, the confidence engine 120 can assign reliability scores to customers, similarly to how it generates confidence scores. In one embodiment, the effect of customer complaints on the confidence score of an asset may be weighted by the reliability score of the customers.

The asset health monitoring system 100 can monitor the confidence scores of the computing assets as the assets are operating in the data center. Such monitoring may be performed periodically, irregularly or continuously. In some embodiments, monitoring occurs in real-time or near real time. If the confidence score drops below or otherwise reaches a threshold value (e.g., "0"), the asset health monitoring system 100 can initiate actions in response. The threshold value can be a uniform value across assets, a per-asset type value, or other value type. In some embodiments, the threshold value is adjustable, either automatically or manually.

In some embodiments, the confidence score dropping below the threshold value indicates that a failure may soon occur or that the chance of a failure has exceeded some chosen value. In response, the asset health monitoring system 100 can initiate testing via the testing planner 135. By initiating testing procedures, the asset health monitoring system 100 can check if the asset is performing normally or is developing problems. If the asset passes the test, asset health monitoring system 100 can increase the asset's confidence score as the system 100 has confirmed that it appears to be functioning correctly. The asset health monitoring system 100 can then designate the asset as "active" or ready for placement back into a production environment. If the asset fails the test, the HMS can initiate remediation procedures via the remediation engine 125.

The test planner 135 can coordinate with the testing service 155 to initiate tests against assets. It can then retrieve the results of those tests. Some tests may be performed directly on the asset while some tests may be performed on multiple assets. For example, testing the network connection of a computing asset may require sending data and/or receiving data at agent assets in communication with a target asset. In some situations, such as for active assets currently in use, the test planner 135 can coordinate with the capacity tracker 130 to "check-out" or deactivate an asset to indicate that the asset should not be used. The capacity reservation service 130 can then stop assigning customers to that asset or activate a migration process to move customers using the asset to other active assets. In some cases, testing may be performed while the asset remains in active use. For example, in the case of network fabric testing, an asset such as a network device or network link can generally continue to service production load while spare host endpoints are used to drive test traffic load through them as part of confidence testing.

Information from the capacity tracker 130 can be used by the asset health monitoring system 100 to select testing procedures or determine how long to run a particular test. For example, if additional capacity is not needed in the data center, the asset health monitoring system 100 can keep testing the computing asset for a longer period of time in order to raise its confidence score higher. However, if assets are needed soon, the asset health monitoring system 100 can limit how long tests are run or select shorter tests to run so that the computing asset can be reactivated and returned to production usage more quickly.

In one embodiment, the data center may provide computing resources on an open market, allowing the establishment of a "spot" price for that computing resource. In one embodiment, the selected testing procedures for computing asset may be based at least partly on the spot price for the computing resources provided by that computing asset. For example, the system may run shorter tests if demand is high (e.g., reflected by a high price) than if demand is low in order to reduce the cost of the computing asset down-time to the data center.

As described above, the testing service 155 can run test against the computing assets. Tests may be run directly on the asset (e.g., computing devices) or on associated assets to test the asset (e.g., host endpoints to test network links or network devices). The test planner 135 can coordinate with the testing service 155 and/or the capacity reservation service 150 to obtain the resources needed to test assets.

In some embodiments, the remediation engine 125 initiates remediation procedures for computing assets. In one embodiment, the remediation engine takes the history of confidence scores into account when deciding what to do with problematic assets. Possible automated actions include marking the asset as "inactive" or "degraded" and/or initiating a repair workflow for the asset. In some cases, the asset health monitoring system 100 can analyze the confidence score history of an asset to identify lemon assets that are frequently defective and may benefit from more in-depth troubleshooting (or complete replacement).

In some cases, the remediation engine 125 can initiate remediation procedures that compensate for assets that are taken out of production or are otherwise considered inactive or unavailable for continued use in production. For example, in the case of faulty network links and devices, the asset health monitoring system 100 can automatically deactivate the associated switch ports and route traffic away from the suspect asset while repair work is underway. If a link is sporadically dropping packets, shifting the traffic in this manner can quickly improve customer experience and may avoid route update storms which can degrade the functioning of otherwise healthy switches in the network fabric, thereby reducing or preventing customer complaints.

In one embodiment, the customer interface 140 allows users to review health data or report problems. In one embodiment, the interface 140 includes a web service that receives reports, instructions, or other communications from customers. For example, the interface 140 may include a web-based or other interface that provides functionality for web site operators, cloud computing service customers, and/or other users to report problems with assets, including failure times, failure symptoms, crash logs, or the like.

In one embodiment, the AHMS manager 145 of FIG. 1 may monitor, track and/or manage the processes of the asset health monitoring system 100. The manager 145 can be in communication with other components of the asset health monitoring system 100 via the network 105. The network 105 may include multiple networking devices (not shown) such as, e.g., switches, edge routers, core routers, etc. The network 105 may, but need not be, a different network than the second network 160 shown in FIG. 1.

In one embodiment, the computing nodes 110 comprise one or more physical computing systems capable of operating one or more virtual machines instances. For example, a host computing system may provide multiple virtual machines ("VM") instances and include a virtual machine manager to manage virtual machines (e.g., a hypervisor or other virtual machine monitor). Customers may operate hosted applications, such as web servers or services, on the computing nodes 110.

In some embodiments, storage nodes are utilized by the asset health monitoring system 100 to store information. The storage nodes can be local to components of the asset health monitoring system 100 or can be on network or distributed systems. Such storage nodes can include magnetic hard drives, solid state drives or memory, optical disc, and/or the like. Various data structures can be used to store the data, such as electronic files, databases, or other data structure. Stored information can include confidence scores (including historical scores), inventory schedules, repair schedules, asset lists, asset data (e.g., identifiers, price lists, age, model and brand, etc.), network topology information, as well as other data.

Figure 2A:
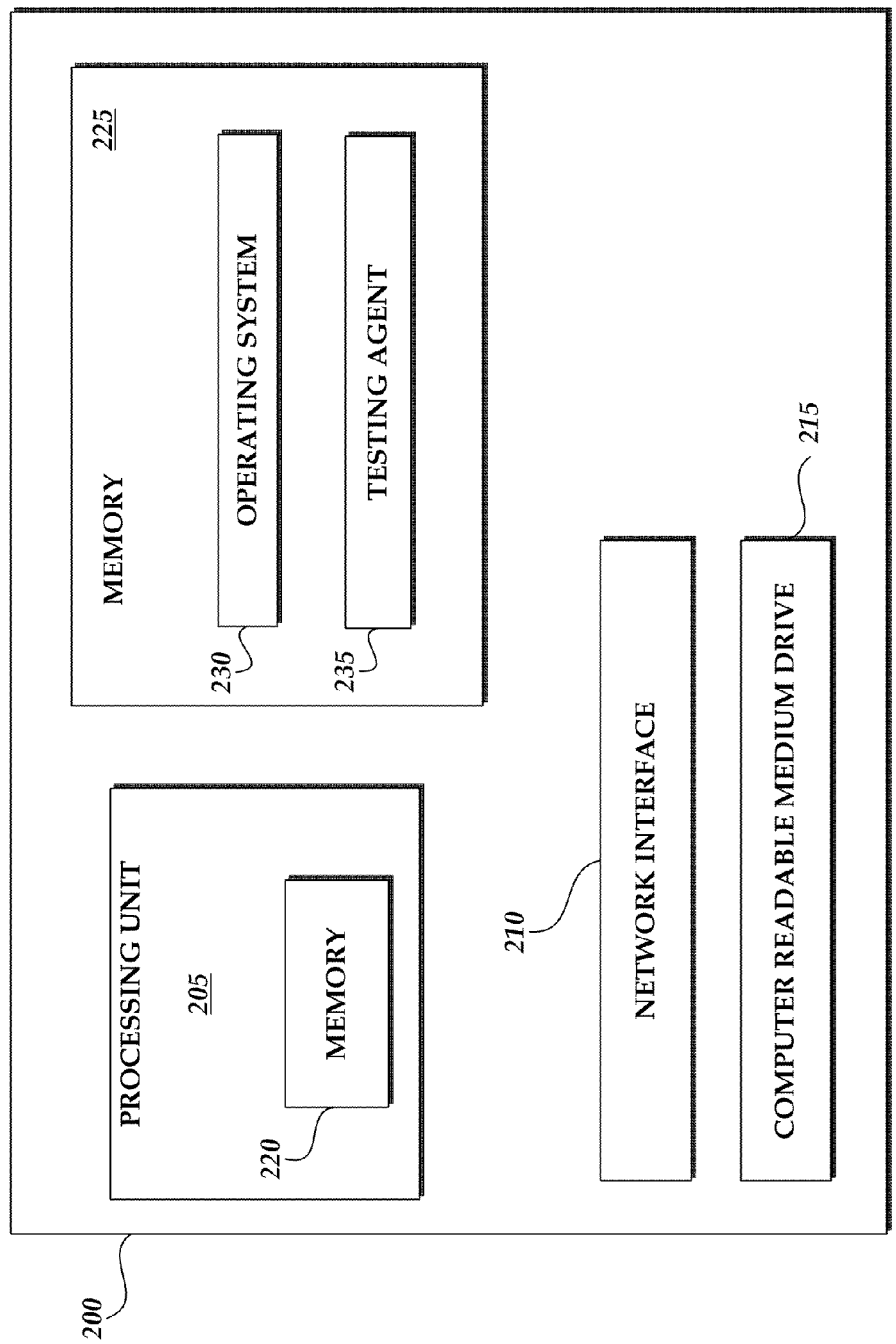
FIG. 2A schematically illustrates an embodiment of a computing asset utilized in embodiments of the asset health monitoring system.

With reference now to FIG. 2A, a block diagram schematically illustrative of a computing asset 200 utilized in embodiments of the asset health monitoring system 100 of FIG. 1 will be described. The computing asset may include many more (or fewer) components than those shown in FIG. 2A.

As illustrated in FIG. 2A, the computing asset 200 can include a processing unit 205, at least one network interface 210, and at least one computer readable medium drive 215, some or all of which may communicate with one another by way of a communication bus. The processing unit 205 may thus receive information and instructions from other computing systems or services via a network. The processing unit 205 may also be associated with a first memory component 220 (e.g., cache). The computing asset can also include a second memory component 225 that can include RAM, ROM and/or other persistent memory. The processing unit 205 may also communicate to and from the second memory 225. The network interface 210 may provide connectivity to one or more networks or computing systems. The at least one computer readable medium drive 215 can also correspond to RAM, ROM, optical memory, disk drive, solid-state drive and/or other persistent memory. Further, the computer readable medium drive 215 may be implemented in a networked environment in which multiple network devices share access to the information persisted on the computer readable medium drive 215.

The memory 225 can contain computer program instructions that the processing unit 205 executes. The memory 225 may store an operating system 230 that provides computer program instructions for use by the processing unit 205. In one embodiment, the memory 225 includes a testing agent 235. The testing agent 235 can be software and/or hardware that include test scripts or testing programs for testing the computing asset 200, components of the computing asset, or other computing assets. In some embodiments, the testing agent 235 is a specialized add-on card or a program. The testing agent can be configured to test various components of the computing asset 200, such as the processing unit 205, first memory 220, second memory 225, network interface 210, computer readable medium drive 215 or other component.

Figure 2B:
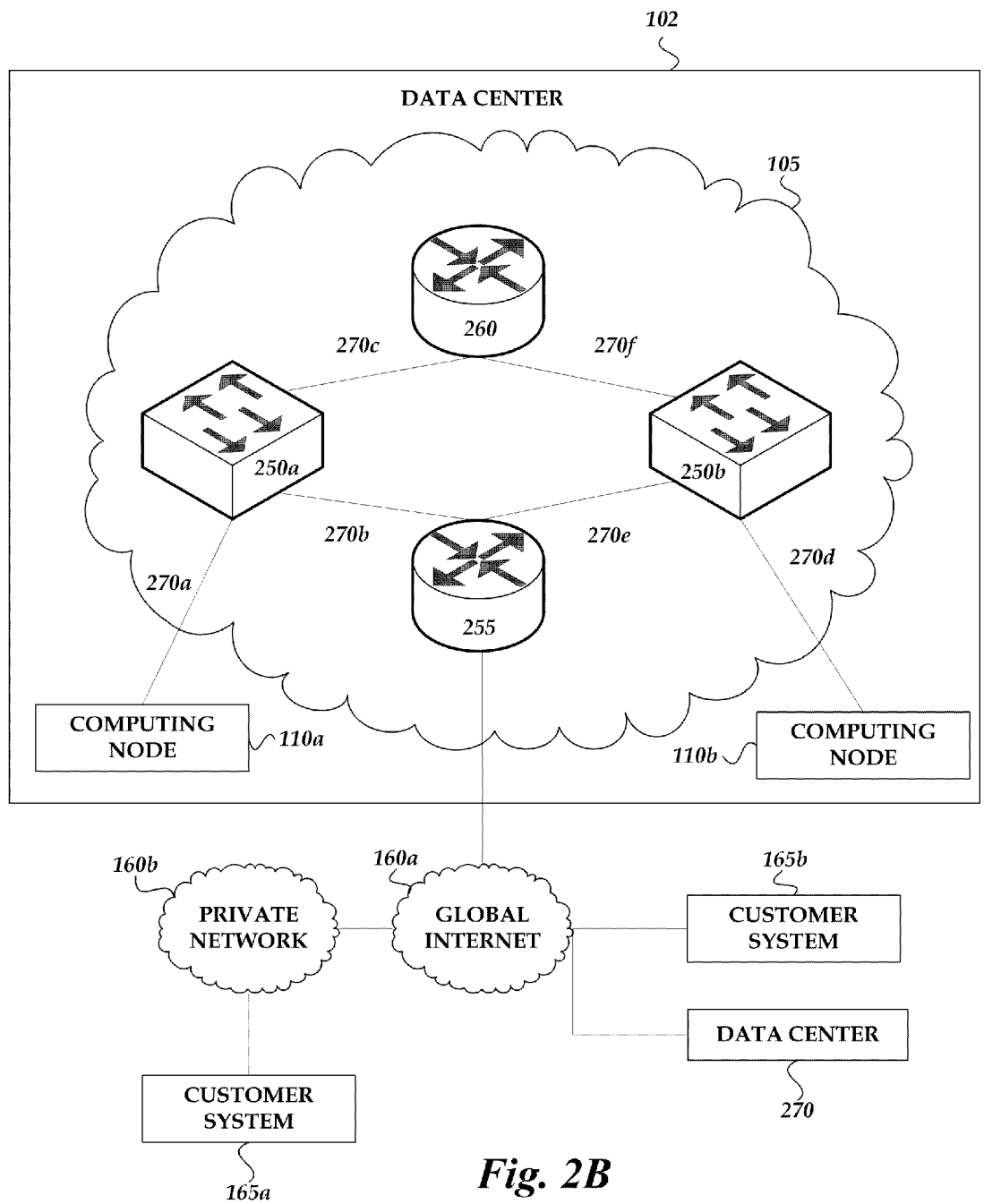
FIG. 2B schematically illustrates an embodiment of the network of FIG. 1.

FIG. 2B schematically illustrates an embodiment of the network 105 of FIG. 1. In the illustrated example, the network 105 may be part of a data center 102 having multiple computing nodes 110a, 110b. The network 105 can provide interconnections for communications between the computing nodes. In some embodiments, the AHMS system 100 monitors components of the network, including switches, routers, nodes and/or links between the switches, routers, and/or nodes.

The network 105 can include various network devices, such as switches 250a-250b, edge router devices 255, core router devices 260, and network links 270a-270f. In the illustrated figure, switch 250a is part of a physical sub-network and is connected to computing node 110a through network link 270a, is connected to edge router 255 through network link 270b, and is connected to core router 260 through network link 270c. Switch 250b is part of another physical sub-network and is connected to computing node 110b via network link 270d, is connected to edge router device 255 via network link 270e, and is connected to core router 260 via network link 270f. The physical sub-networks established by switches 250a, 250b, can in turn, be connected to each other and other networks (e.g., the global internet 160a) via the edge routers 255 and/or the core routers 260. In one embodiment, the edge routers 255 provide gateways between two or more sub-networks or networks. In one embodiment, the core routers 260 manage communications within the network 105, such as by routing or otherwise forwarding packets or other data transmissions as appropriate based on characteristics of such data transmissions (e.g., header information including source and/or destination addresses, protocol identifiers, etc.) and/or the characteristics of the network 105 itself (e.g., routes based on the physical network topology, etc.).

In one embodiment, the network 105 is connected to a global internet 160a external to the data center 102. The global internet can provide access to one or more customer computing systems 165a via private network 160b, to one or more other globally accessible data centers 270 that each have multiple computing systems, and to one or more other computing systems 165b. The global internet 160a can be a publicly accessible network of networks, such as the Internet, and the private network 160b can be an organization's network that is wholly or partially inaccessible from computing systems external to the private network 160b. Customer computing systems 165b can be home computing systems or mobile computing devices that each connects directly to the global internet 160a (e.g., via a telephone line, cable modem, a Digital Subscriber Line ("DSL"), cellular network or other wireless connection, etc.). Customer computing systems 165b can also be computing assets in a corporate on-premise environment, such as servers in a large enterprise data center.

Figure 3:
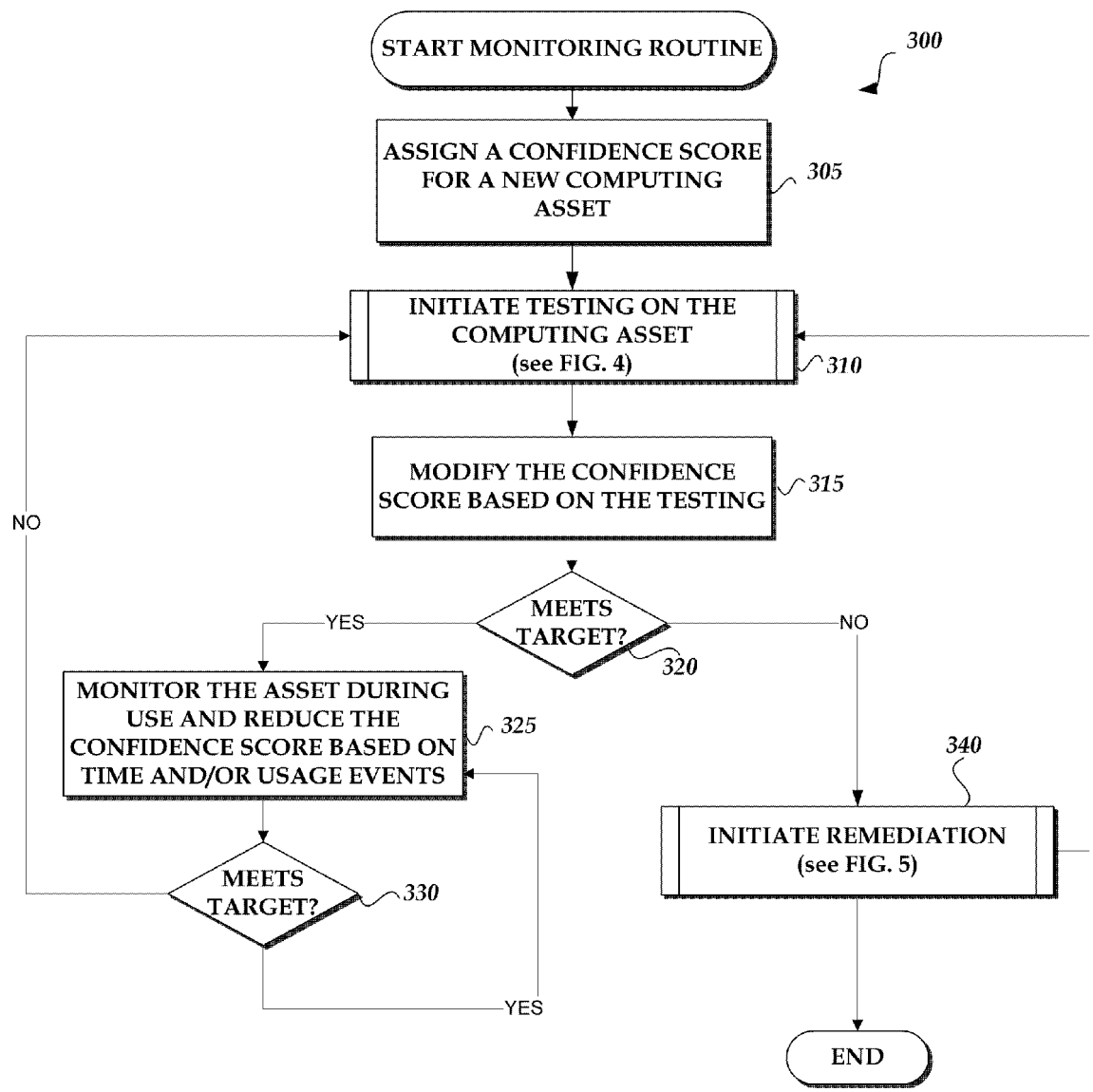
FIG. 3 schematically illustrates a logical flow diagram for an example monitoring routine usable by embodiments of the asset health monitoring system.

FIG. 3 schematically illustrates a logical flow diagram for an example monitoring routine 300. In some implementations, the routine is performed by embodiments of the asset health monitoring system 100 described with reference to FIG. 1 or by one of its components, such as the confidence score engine 120. For ease of explanation, the following describes the routine as performed by the asset health monitoring system 100. The routine is discussed in the context of an example scenario that is intended to illustrate, but not to limit, various aspects of the asset health monitoring system 100.

Beginning at block 305, the asset health monitoring system 100 assigns or generates a confidence score for a new computing asset. As described above, various factors such as asset type, model, brand or the like can affect the confidence score. In one embodiment, new assets may be assigned a confidence score of 0 or some other base value. For example, the system can maintain a database or other data structure of base values and lookup one or more characteristics of the computing asset in order to identify a base value to assign to that asset. The confidence score can based at least partly on the number of tests passed by the computing asset and/or the running time of test(s) run against the computing asset.

At block 310, the asset health monitoring system 100 initiates testing on the computing asset. The asset health monitoring system 100 can select which tests are run against the computing asset. The selected tests can vary based on the history of the computing asset, the resource constraints of the data center, as well as other factors. For example, the system 100 can select to run burn-in tests for new assets. The testing selection routine is described in additional detail in FIG. 4. In some embodiments, the system 100 proceeds to block 315 to modify the confidence score. In some embodiments, the system 100 may proceed directly to block 340 to initiate remediation in some cases, such as when the computing asset fails a test.

At block 315, the asset health monitoring system 100 modifies the confidence score based on the testing. The system 100 can analyze the results of the tests and can then modify the confidence score based on the test results. The system 100 can then generate a new confidence score or increase (or decrease) the previous confidence score based on the results. The amount of change in the confidence score can be based on the particular test run, how long the test was run, as well as other factors. For example, a test that involved manual oversight by an administrator may be given a higher confidence score than a fully automated test. In another example, a variable length test can have a variable effect on the confidence score based on how long the test was run. In some embodiments, the effect of a test on the confidence score may be weighted. For example, a computing asset that primarily provides storage may require more storage testing to raise its overall confidence score. Thus, the system 100 can reduce the weight of non-storage related tests so that those tests have less effect on the confidence score for that storage computing asset. Likewise a computing asset that primarily provides networking resources might need more network testing to raise its overall confidence score, and so on for different types of computing assets. In some embodiments, if the asset passes the test, the system 100 raises the confidence score. In some embodiments, tests that are longer or more thorough raise the confidence score by a higher amount than shorter or less thorough tests. If the asset fails, the system 100 can lower the confidence score. In some embodiments, the system 100 can run multiple tests and the computing asset may fail some tests while passing others. The system 100 can generate a score that accounts for the failed test. For example, tests can have an assigned value (e.g., set by the system 100 or an operator of the system 100) and passing a test can cause the confidence score to rise by its assigned value while failing the test can cause the confidence score to decrease by its assigned value.

At block 320, the asset health monitoring system 100 determines if the confidence score meets a target threshold value. If the confidence score meets the target, the computing asset can be put back into production use. The asset health monitoring system 100 then proceeds to block 325. However, if the confidence score is lower than the threshold target, the asset health monitoring system 100 initiates remediation procedures and proceeds to block 340. In some embodiments, the system may skip block 320 and instead proceed directly to block 325 if the asset passed testing and skip to block 340 if the asset failed testing.

At block 325, the asset health monitoring system 100 monitors the asset during its use. As described above, during monitoring, the asset health monitoring system 100 decays the confidence score as a function of time and/or reduces the confidence score based on usage events. This monitoring period may continue for a prolonged period of time, such as hours, days, weeks or months, until the confidence score drops below a threshold target.

At block 330, the asset health monitoring system 100 checks the confidence score of the asset against a second threshold target. In some embodiments, the second threshold target is the same as the first threshold target in block 320. If the confidence score is below the threshold target, the asset health monitoring system 100 proceeds to block 310 and initiates testing on the computing asset in order determine whether the confidence score can be raised or if remediation procedures may be needed.

If the confidence score remains above the threshold target, the asset health monitoring system 100 can continue monitoring the computing asset. The routine 300 then proceeds back to block 325 for continued monitoring.

Going back to block 320, the asset health monitoring system 100 proceeds to block 340 and initiates remediation procedures if the asset confidence score drops below a target threshold value. The asset health monitoring system 100 selects which remediation procedure to initiate based on various factors, such as the computing asset history and the resource constraints of the data center. The remediation selection routine is described in further detail in FIG. 5. In some cases, the remediation process results in the replacement of the asset, which can end monitoring of that asset and ends the routine 300. In some cases, remediation results in the asset being placed back in production, in which case, monitoring of the asset can continue and the routine 300 proceeds back to block 310.

Figure 4:
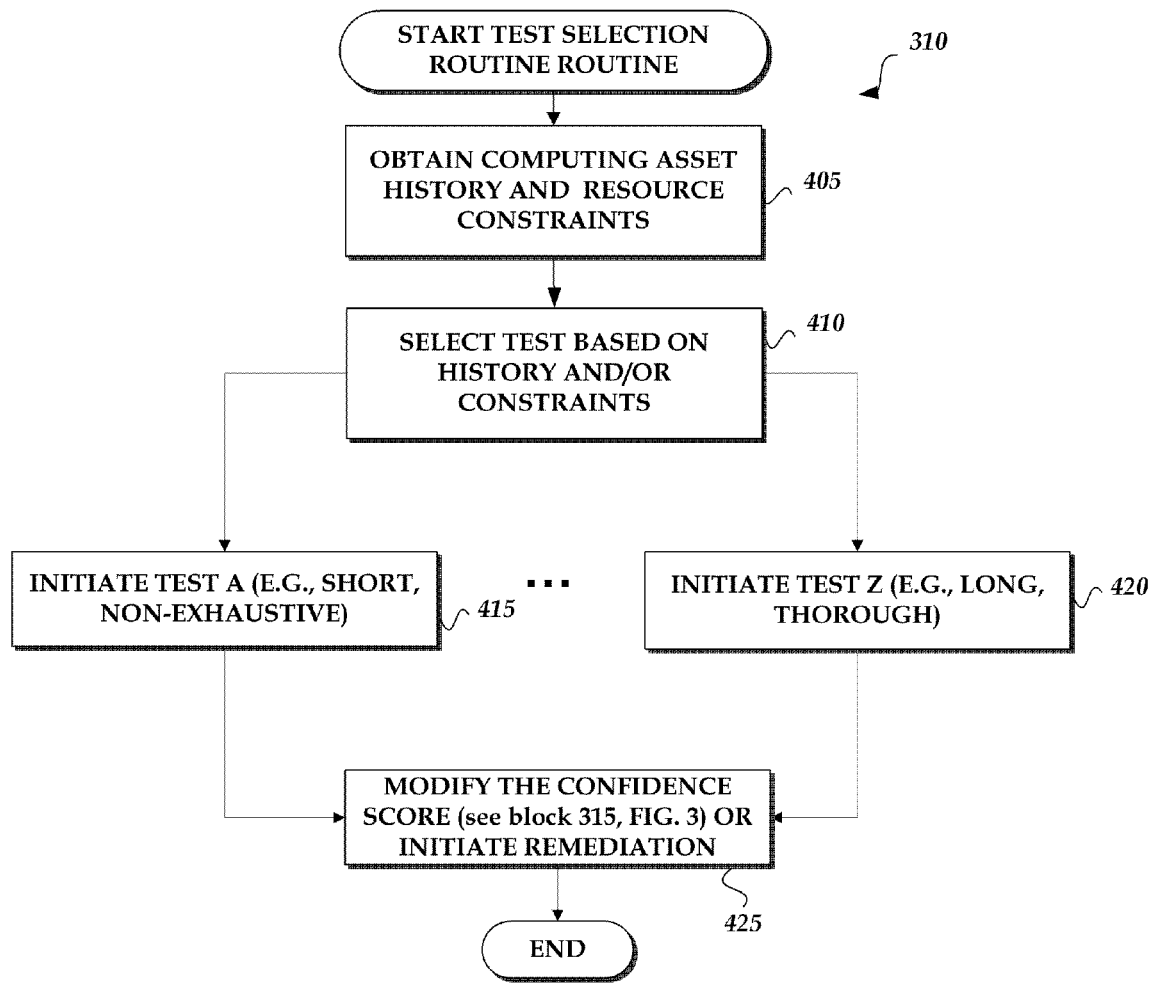
FIG. 4 schematically illustrates a logical flow diagram for an example test selection routine usable by embodiments of the asset health monitoring system.

FIG. 4 schematically illustrates a logical flow diagram for an example test selection routine 310. In some implementations, the routine is performed by embodiments of the asset health monitoring system 100 described with reference to FIG. 1 or by one of its components, such as the testing planner 135. For ease of explanation, the following describes the routine as performed by the asset health monitoring system 100. The routine is discussed in the context of an example scenario that is intended to illustrate, but not to limit, various aspects of the asset health monitoring system 100.

Beginning at block 405, the asset health monitoring system 100 obtains computing asset history and/or resource constraints for a data center. The computing asset history data can include previous confidence scores, usage history, purchase or intake information, age, repair histories and other historical data for the asset. The previous confidence scores can be used to identify problematic assets or determine asset sub-systems to test. Meanwhile, the resource constraints can be used to select a test to run against the asset. For example, the system 100 can determine that, based on current and/or historical usage by customers, additional resource capacity (e.g., processing or storage capacity) is needed within an estimated time period (e.g., 48 hours). The system 100 can then select what test or tests to run based on that estimated time period. For example, the system can select a test that can be completed within 48 hours or can choose to run a variable length test for less than 48 hours.

Beginning at block 410, the asset health monitoring system 100 selects one or more tests to run against the asset based at least partly on the asset history and/or the resource constraints. Other factors, such as asset type, can also be used to select the tests. For example, if the asset health monitoring system 100 uses multiple confidence scores for assets, the asset health monitoring system 100 can identify sub-systems with low confidence and select tests that target those sub-systems with low confidence scores. Further, the asset health monitoring system 100 can select to run longer and/or more thorough test or run the same test for longer amounts of time in order to build greater confidence in the ability of an asset to work correctly in a production environment. This higher certainty in the asset can be reflected by assigning a higher confidence score to that asset.

In one embodiment, tests are assigned a weighted test value, with the weight of a test based at least partly on the length and/or thoroughness of the test. For example, passing a test run for a longer time period can indicate that there is greater certainty that the computing asset will function correctly, thus, the change in the confidence score can be greater (e.g., increased by a larger amount) than if the same test were run for a shorter time period.

At block 415 and 420, the asset health monitoring system 100 initiates the selected test or tests. The tests may be performed by the asset health monitoring system 100 or a separate service, such as the testing service 155 of FIG. 1. Many different tests can be performed, which the system 100 selects from. In some cases, the system 100 selects tests that are more thorough and/or longer while in some cases, the system selects tests that are less exhaustive and/or shorter. Such tests can include short tests, long tests, variable length tests, stress tests for systems or sub-systems, burn-in tests, network tests, category tests that test specific components or sub-systems or that test systems that handle particular workloads (e.g., processing, storage, etc.), or the like.

Tests may be targeted for assets (e.g., host computer), specific components of an asset (e.g., network interface card, processor, memory, etc.), or for groups of assets (e.g., network or distributed storage system). For example, the asset health monitoring system 100 can initiate burn-in testing of computing nodes 110, such as nodes that host virtual machine instances. Such tests can include variable length stress tests for CPU, memory, power, and/or network.

In one embodiment, the asset health monitoring system 100 provides confidence scores to network assets such as network devices and links, provides automatic remediation of network assets, and/or provides consensus driven endpoint testing. Network testing can be more difficult than single host testing. For example, single host testing can be performed in isolation, without interaction with other hosts. Also, a host can be taken out of service and tested without affecting customer applications or virtual machine instances, which can be moved to other hosts. In contrast, network testing can require coordination between multiple assets. In addition, network testing can require accounting for the network topology, accounting for equal-cost multi-path routing (ECMP) hashing algorithms (or their results) or other routing algorithms, sufficient endpoints to provide adequate coverage for the test asset, and knowledge that the act of testing the network itself disturbs the network. For example, the system 100 can analyze network traffic data using network topology and/or routing algorithm information to identify assets that may be causing network errors.

For example, determining whether a network path is faulty and then triangulating the faulty asset may require that a sufficiently high packet rate be driven through the test network in order to generate low-probability errors, such as those that may occur only under heavy load. In addition, in some instances, it can be difficult to identify the source of physical network layer issues due to the fact that packets are not dropped unless frame corruption can be caught in the IP header checksum. If the frame corruption occurs elsewhere (which can be likely for jumbo frames), a router can generally identify a CRC error only as the tail of the frame passes through it. In some cases, such as in networks using cut-through switching where packets are routed and transmitted to the next hop before being completely received, this can have an effect of one bad link in a mesh network causing the entire network to appear problematic due to CRC errors from bad packets being transmitted across a large portion of the mesh. Thus programmatic network tests that account for such issues can greatly relieve the burdens associated with network operational management, failure identification and testing. One embodiment of such a network testing routine in discussed in additional detail in FIG. 6.

At block 425, the system 100 can modify the confidence score based on the testing, as described in block 315 of FIG. 3. The routine can then continue proceeding as described above after block 315. In some embodiments, the system 100 may, alternatively or in addition, initiate remediation of the computing asset. The routine 310 can then end.

Figure 5:
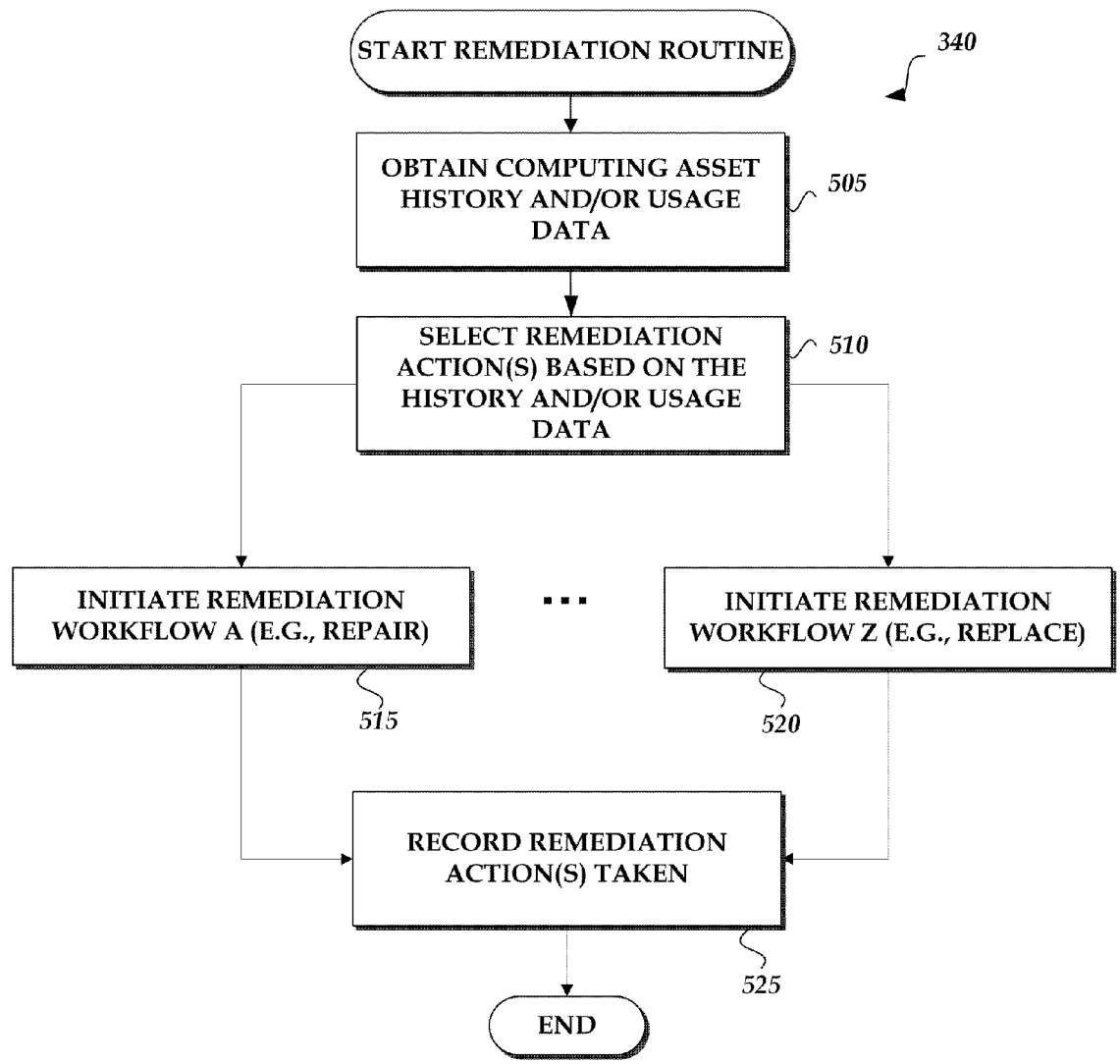
FIG. 5 schematically illustrates a logical flow diagram for an example remediation routine usable by embodiments of the asset health monitoring system.

FIG. 5 schematically illustrates a logical flow diagram for an example remediation routine 340. In some implementations, the routine is performed by embodiments of the asset health monitoring system 100 described with reference to FIG. 1 or by one of its components, such as the remediation engine 125. For ease of explanation, the following describes the routine as performed by the asset health monitoring system 100. The routine is discussed in the context of an example scenario that is intended to illustrate, but not to limit, various aspects of the asset health monitoring system 100.

Beginning at block 505, the asset health monitoring system 100 obtains computing asset history and/or usage data. The computing asset history data can include previous confidence scores and repair histories. The usage data can include the current workload on the asset, the number of customers served by the asset, the amount of customer data stored by the asset, the amount of network traffic handled by the asset, or the like. The previous confidence scores can be used to identify problematic assets or asset sub-systems.

Beginning at block 510, the asset health monitoring system 100 selects one or more remediation actions or tasks to initiate for the asset based at least partly on the asset history and/or the usage data. Other factors, such as asset type can also be used to select the remediation task. For example, if an asset is relatively old, the asset health monitoring system 100 may initiate replacement rather than initiate a repair as new assets generally have higher performance or are more energy efficient. In another example, the asset health monitoring system 100 may determine that a particular asset is a "lemon" due to repeated failures and initiate replacement rather than repair. In some embodiments, that system 100 considers resource constraints in selecting remediation tasks. For example, the system 100 can select remediation procedures that can be completed before a deadline when additional resource capacity is needed.

At block 515 and 520, the asset health monitoring system 100 initiates a selected remediation action or workflow, which can include one or more tasks. The remediation tasks may be performed by the asset health monitoring system 100, by a separate service, or by repair personnel. Many different tasks can be performed. In the illustrated embodiment, the asset health monitoring system 100 selects from Remediation Workflow A to Remediation Workflow Z. Such remediation workflows can include one or more tasks such as: generating work orders to conduct repairs (e.g., rebuilding servers, fixing environmental problems such as high temperatures, replacing computer parts, etc.); ordering replacement parts or devices; replacing functionally by activating backup systems or rerouting network traffic; combinations of the same or the like. In one embodiment, the asset health monitoring system 100 initiates handoff of workload (e.g., handling of network traffic or hosting of customers) from an asset being taken out of service to backup or reserve computing assets. After initiating the remediation task(s), the routine 340 then ends.

At block 525, the system 100 can record the action or actions taken. In one embodiment, the system 100 records remediation actions or tasks in the computing asset's history. The system 100 can also record the results of the remediation actions. Such information can be used to determine future remediation actions or to determine whether the computing asset is a "lemon." The routine 340 can then end and the system 100 can proceed with monitoring the asset. For example, the remediation action may have repaired the asset and the system can then proceed as described in block 310 of FIG. 3 (and in subsequent blocks) to initiate testing and assign a new confidence score to the computing asset that reflects the repair. In some situations, the remediation action may have included replacement or discardment of the computing asset, and the system 100 can end tracking of the computing asset.

Figure 6:
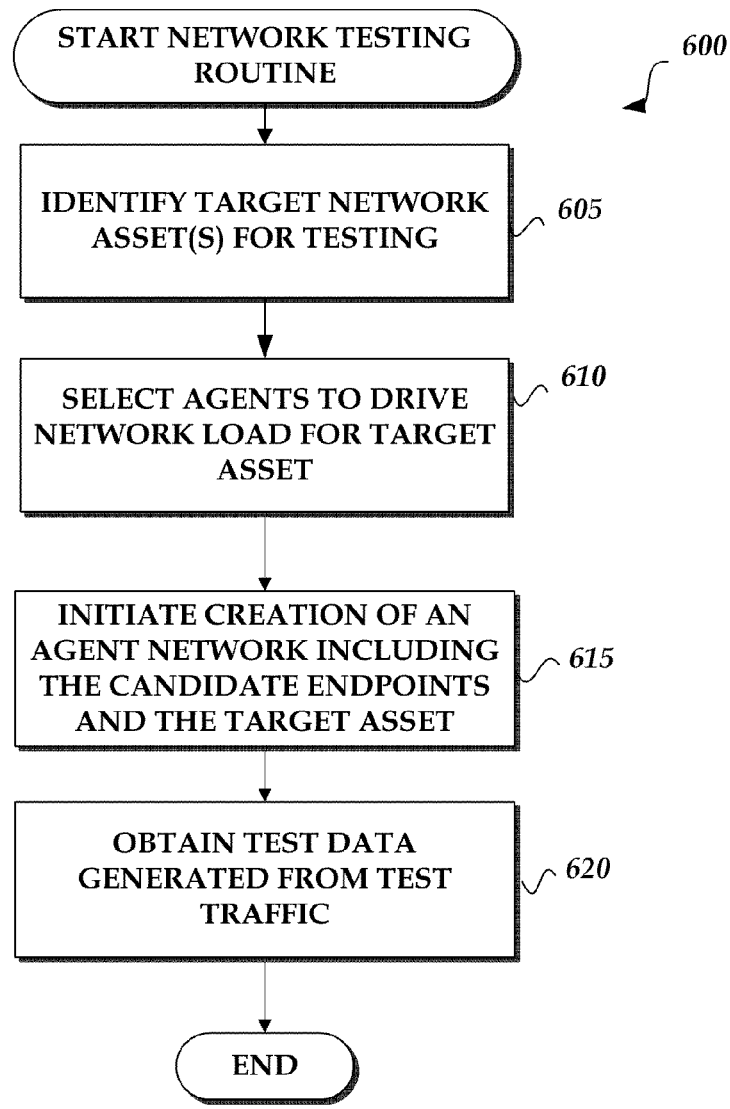
FIG. 6 schematically illustrates a logical flow diagram for an example network testing routine sable by embodiments of the asset health monitoring system.

FIG. 6 schematically illustrates a logical flow diagram for an example network testing routine 340. In some implementations, the routine is performed by embodiments of the asset health monitoring system 100 described with reference to FIG. 1 or by one of its components, such as the testing planner 135. In some embodiments, the asset health monitoring system 100 may initiate testing while another service, such as the testing service 155, performs the actual testing. For ease of explanation, the following describes the routine as performed by the asset health monitoring system 100. The routine is discussed in the context of an example scenario that is intended to illustrate, but not to limit, various aspects of the asset health monitoring system 100.

Beginning at block 605, the asset health monitoring system 100 identifies target network asset or assets (network devices or network links) for testing. In one embodiment, the asset health monitoring system 100 selects network assets with low confidence scores (e.g., below a target threshold, with no assigned score, with a 0 score, or the like).

At block 610, the asset health monitoring system 100 selects agents to drive network load for the target assets. For example, if the target network link A connects endpoints E1 and E2, the asset health monitoring system 100 can select E1 and E2 (or other endpoints that utilize network link A) as testing agents. In another example, if target router B is connected to endpoints H1 and H2, the asset health monitoring system 100 can select H1 and H2 (or other endpoints that send traffic through target router B) as testing agents. In one embodiment, the asset health monitoring system 100 preferentially selects spare hosts or reserved hosts as agents to reduce or minimize the effect on customers of the data center.

At block 615, the asset health monitoring system 100 initiates creation of an agent network that includes the selected agents and the target assets. The same agents can be used to test multiple target assets. For example, endpoints E1 and E2 may utilize links L1 and L2, both of which can be tested. In some cases, testing may be run serially between pairs of agents, for example, if there are not enough agents available to test all links in parallel.

At block 620, the asset health monitoring system 100 obtains test data generated from running test traffic through the agent network. Such test data may be recorded from the agents or other devices operating on the agent network mesh. The asset health monitoring system 100 can then analyze the test data in order to generate confidence scores and/or initiate remediation. For example, the asset health monitoring system 100 may use one or more samples of test data to triangulate failing links and/or devices. In some cases, the triangulation may only identify a set of possible problem assets (e.g., a sub-network, rack, or other group of assets). In such cases, the asset health monitoring system 100 can initiate additional testing to identify problem assets with more specificity. Additional information can also be obtained from other sources. In one embodiment, the asset health monitoring system 100 uses Simple Network Management Protocol (SNMP) or other protocols to obtain information from network devices in the agent network, including from the target assets. Such information can include metrics describing CRC errors, dropped packets, devices showing temperature warnings, etc. The asset health monitoring system 100 can then use such information to identify or corroborate identification of problem assets. For example, in some cases such as CRC errors and cut-through switching, ranking links in order of CRC error magnitude can provide a quick ordered list of the most suspect links. After obtaining the test data, the routine 600 ends.

In one embodiment, testing is conducted continuously during a testing period during which links/devices are disabled or customer traffic is otherwise shifted off, for repair or other remediation while testing continues in parallel for the remaining target assets. This may increase the turnaround time for putting network assets back into service, but allows testing and remediation to occur in parallel with production traffic.

Figure 7:
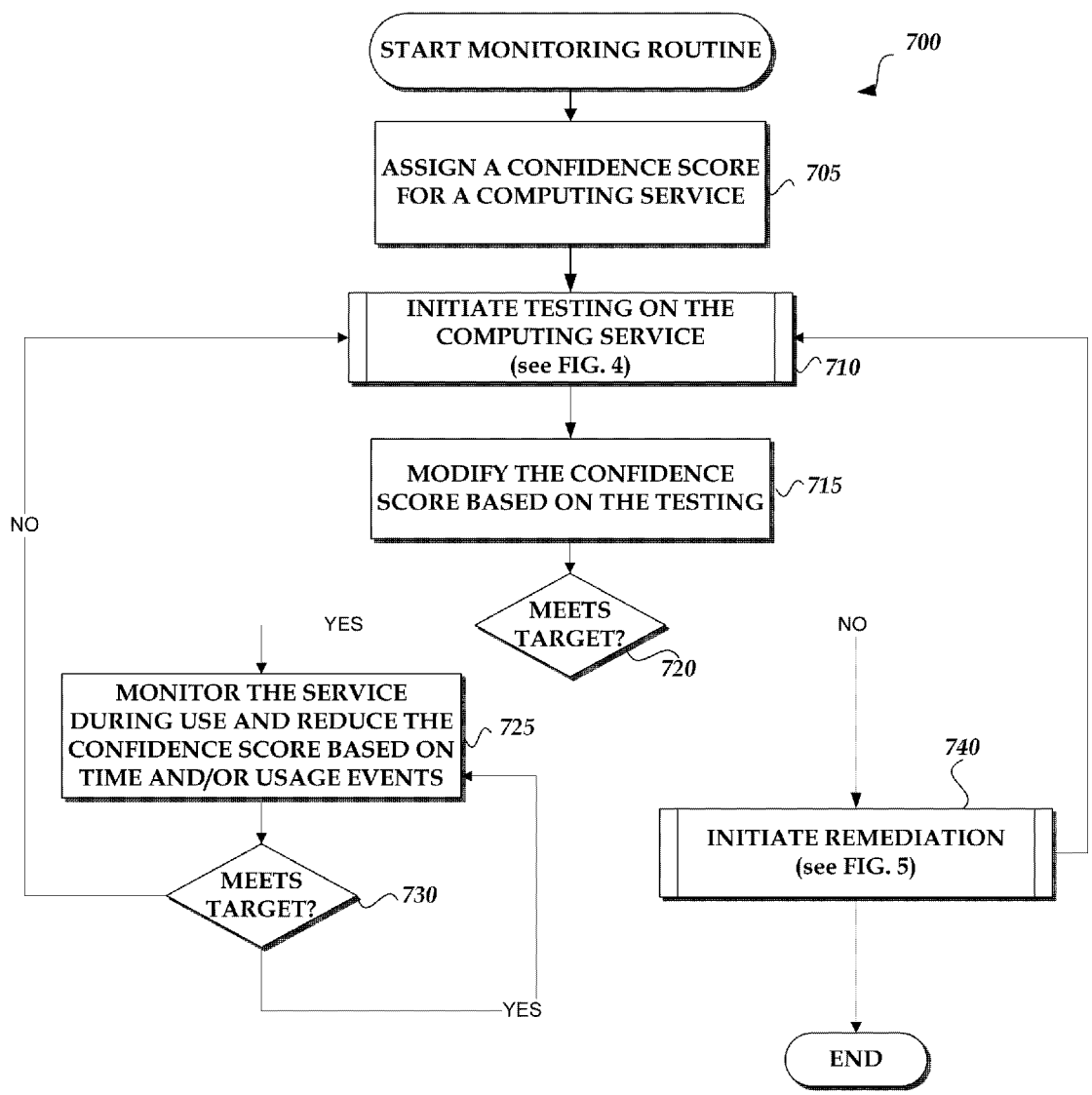
FIG. 7 schematically illustrates a logical flow diagram for an embodiment of the monitoring routine of FIG. 3 for services.

FIG. 7 schematically illustrates a logical flow diagram for an embodiment of the monitoring routine 300 of FIG. 3. The illustrated embodiment of the monitoring routine 700 describes monitoring of services. Services can include computing functionality provided by a computing resource provider, such as compute services, storage services, networking services, database services and/or workflow services (e.g., workflow execution tracking, task assignment, task status tracking, etc.). Such services can be used to provide application hosting, web hosting, high performance computing, data backup, and data storage to customers.

In some implementations, the monitoring routine 700 is performed by embodiments of the asset health monitoring system 100 described with reference to FIG. 1 or by one of its components, such as the confidence score engine 120. For ease of explanation, the following describes the routine as performed by the asset health monitoring system 100. In some embodiments, the asset health monitoring system 100 performs both the monitoring routine 700 of FIG. 7 and the monitoring routine 300 of FIG. 3, separately or in combination. The routine 700 is discussed in the context of an example scenario that is intended to illustrate, but not to limit, various aspects of the asset health monitoring system 100. Beginning at block 705, the asset health monitoring system 100 assigns or generates a confidence score for a service. In some embodiments, confidence scores are also assigned to computing assets associated with the service (e.g., computing assets that run processes, provide storage, carry traffic, or provide other functionality for the service) and monitored by the system 100, as described above in FIG. 3. Various factors such as service type, customer input (e.g., complaints), user input, service history, or the like can affect the confidence score assigned to the service. For example, the confidence score can be based at least partly on the number of tests passed and/or the running time of tests run against the computing service and/or assets associated with the computing service.

In some embodiments, the confidence score includes or aggregates the scores from the computing assets associated with the service. In one embodiment, an aggregation formula generates the confidence score for the service based at least partly on the confidence scores of the service's assets. Examples of such aggregation formulas are described in further detail below, in relation to FIG. 8. The confidence scores for different computing assets may be weighted based on their importance to the service. For example, a confidence score for a storage service may be based at least partly on confidence scores for storage servers, network links, network devices and user interface software, asset allocation software. As the storage servers are generally the primary component of the storage service, the confidence scores for the storage servers may be weighted higher than the other computing assets associated with the storage service. In some embodiments, the confidence score of a first service is based at least partly on confidence scores of one or more associated services (and/or computing assets associated with those services). For example, a storage service may rely on a network service to transfer data; thus, in some embodiments, the confidence score of the storage service is affected by the health of the network service.

At block 710, the asset health monitoring system 100 initiates testing on the service and/or assets associated with the service. The asset health monitoring system 100 can select which tests are run against the service. The selected tests can vary based on the history of the service, the resource constraints of the data center, as well as other factors. For example, the system 100 can select to run burn-in tests for new assets. The testing selection routine for services can be substantially similar to the routine for computing assets described in FIG. 4. In some embodiments, the system 100 proceeds to block 715 to modify the confidence score. In some embodiments, the system 100 may proceed directly to block 740 to initiate remediation in some cases, such as when the computing asset fails a test.

In some situations, computing assets may be dynamically assigned to services and the asset health monitoring system 100 may obtain information about the assets associated with the service being tested with the capacity reservation service 150 of FIG. 1 or another service that maintains information (e.g. in a database or other data structure) of computing assets associated with services. After obtaining the computing asset information, the system 100 can then proceed with testing some or all of the assets.

At block 715, the asset health monitoring system 100 modifies the confidence score based on the testing. The system 100 can analyze the results of the tests and can then modify the confidence score based on the test results. The system 100 can then generate a new confidence score, increase (or decrease), transition to a different state (e.g., "degraded" or "healthy"), or otherwise modify the previous confidence score based on the results. The amount of change or the next state of the confidence score can be based on the particular test run, how long the test was run, as well as other factors. For example, a test that involved manual oversight by an administrator may be given a higher confidence score than a fully automated test. In another example, a variable length test can have a variable effect on the confidence score based on how long the test was run. In some embodiments, the effect of a test on the confidence score may be weighted. For example, a service that primarily provides storage may require more storage testing to raise its overall confidence score. Thus, the system 100 can reduce the weight of non-storage related tests so that those tests have less effect on the confidence score for that storage service. Likewise a service that primarily provides networking resources might need more network testing to raise its overall confidence score, and so on for different types of services.

In some embodiments, if the service passes the test, the system 100 raises the confidence score. In some embodiments, tests that are longer or more thorough raise the confidence score by a higher amount than shorter or less thorough tests. If the service fails (or computing assets associated with the service fail the tests), the system 100 can lower the confidence score. In some embodiments, the system 100 can run multiple tests and the computing service may fail some tests while passing others. The system 100 can generate a score that accounts for the failed tests. For example, tests can have an assigned value (e.g., set by the system 100 or an operator of the system 100) and passing a test can cause the confidence score to rise by its assigned value while failing the test can cause the confidence score to decrease by its assigned value.

In some embodiments, testing of the service can include end-to-end testing and/or system testing. Such testing can include validating the process and/or data flow from the start point of the service to the end point of the service in relation to a user transaction. For example, the end-to-end testing can simulate the interactions of a user with the service, such as requesting that the service store or host a file. The testing can also include testing of the service against specified requirements for the service, including tests for correctness, reliability, and/or performance. The testing may be selected to test the operation of the service and its components as a whole.

At block 720, the asset health monitoring system 100 determines if the confidence score meets a target threshold value. If the confidence score meets the target, the computing service can continue operating. The asset health monitoring system 100 then proceeds to block 725. However, if the confidence score is lower than the threshold target, the asset health monitoring system 100 can initiate remediation procedures and proceeds to block 740. In some embodiments, the system may skip block 720 and instead proceed directly to block 725 if the service passed testing and skip to block 740 if the service failed testing.

At block 725, the asset health monitoring system 100 monitors the service during its operation. As described above, during monitoring, the asset health monitoring system 100 decays the confidence score as a function of time and/or reduces the confidence score based on usage events. This monitoring period may continue for a prolonged period of time, such as hours, days, weeks or months, until the confidence score drops below a threshold target.

At block 730, the asset health monitoring system 100 checks the confidence score of the service against a second threshold target. In some embodiments, the second threshold target is the same as the first threshold target in block 720. If the confidence score is below the threshold target, the asset health monitoring system 100 proceeds to block 710 and initiates testing on the computing service in order determine whether the confidence score can be raised or if remediation procedures may be needed.

If the confidence score remains above the threshold target, the asset health monitoring system 100 can continue monitoring the computing service. The routine 700 then proceeds back to block 725 for continued monitoring.

Going back to block 720, the asset health monitoring system 100 proceeds to block 740 and initiates remediation procedures if the service confidence score drops below a target threshold value. The asset health monitoring system 100 selects which remediation procedure to initiate based on various factors, such as the history of the service and the resource constraints of the data center. The remediation selection routine for the service is substantially similar to the routine for computing assets described in FIG. 5. In some cases, remediation results in the assigning additional or different computing assets to the service to resolve degradations in the service, in which case, the routine proceeds back to block 710 for retesting and monitoring of the service can continue.

Figure 8:
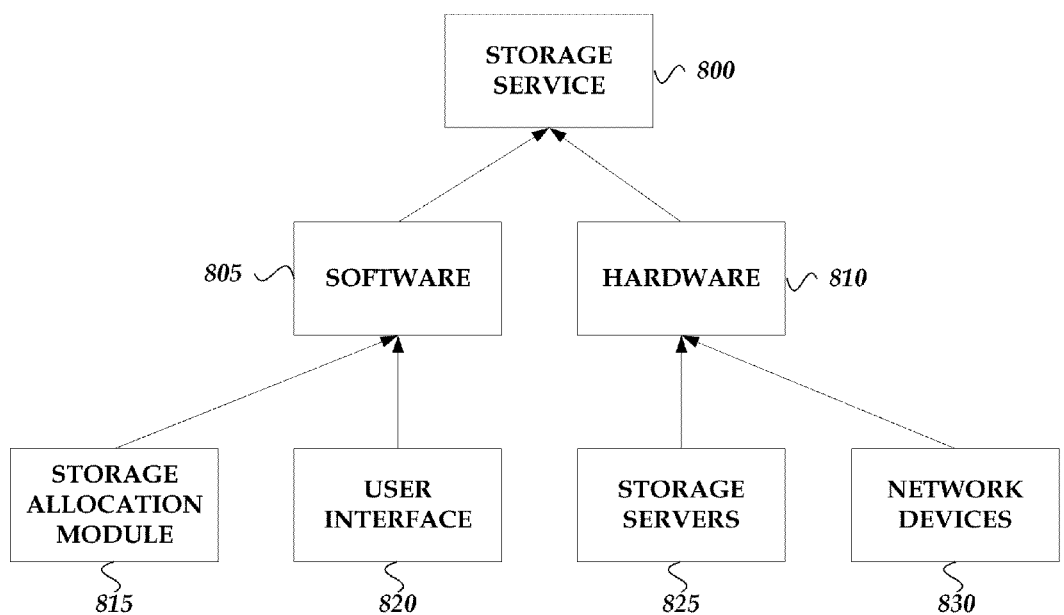
FIG. 8 illustrates an example dependency tree corresponding to a service and computing assets associated with the service usable by embodiments of the asset health monitoring system.

FIG. 8 illustrates an example dependency tree corresponding to a service and computing assets associated with the service. In some embodiments, the asset health monitoring system 100 generates a dependency tree or graph to represent the confidence score for the service and its associated computing assets, which can include hardware and/or software. In some embodiments, the system 100 provides the dependency tree in a report to a user or customer. In one embodiment, the dependency tree represents dependencies of the services and/or computing assets. For example, the root of the tree 800 can represent the service, with a second level including nodes depending from the root representing software components 805 and hardware components 810, with a third level including nodes representing software sub-components 815, 820 and hardware sub-components 825, 830 depending from the second level software and hardware nodes, and so on for additional levels representing more specific software and/or hardware sub-components.

In some embodiments, the confidence scores of nodes on the tree are dependent on the confidence scores of its sub-nodes. For example, the confidence score of hardware node 810 can depend on or be calculated from the confidence scores of the storage servers node 825 and the network devices node 830. In turn, the confidence score of the storage servers node 825 can depend on the confidence scores of the CPUs and hard drives of the storage servers, while the confidence score of the network devices node 830 can depend on the confidence scores of individual routers and switches.

In some embodiments, the confidence score for a service incorporates confidence scores of software modules that are utilized by or part of the service. The confidence scores of the software modules can be based on testing of the software modules and/or on testing the hardware running the software modules. In some embodiments, testing both the software and the hardware can enable more accurate diagnosis of problems. For example, a first test may show that a user interface is responding slowly to user input, while a second test on the computer server associated with the user interface may show that the computer server is thrashing its hard disk, causing slow responsiveness. Advantageously, in the above example, the first test narrows down the possible causes (e.g. to the hardware associated with the user interface), while the second test pinpoints the problem. However, in some embodiments, the system may test only the hardware associated with the software or only the software module, rather than both.

Various formulas can be used to calculate the confidence scores of the nodes. One example formula that may be used is $CS(Y)=W_1 \times CS(Y_1)+W_2 \times CS(Y_2)$, where the confidence score ("CS") of Y is based on weighted confidence scores of its sub-components $Y_1$ and $Y_2$. Different sub-components may have different weights (e.g., $W_1$ and $W_2$). The formula can be applied recursively to $Y_1$ and $Y_2$ to calculate their confidence scores based on their sub-components and so on until the lowest level of sub-components are reached. Many variations of the above formula are possible, such as having three or more sub-component variables, scaling the score to a particular range (e.g., 1-10, 1-100, A-F, etc.) or having un-weighted confidence scores. One variation of the formula is $CS(Y)=W_1 \times CS(Y_1)+W_2 \times CS(Y_2)+W_3 T(Y)$, where $T(Y)$ represents a confidence score generated by running tests on Y.

For example, for service Y, T(Y) may be generated by running end-to-end tests to generate a confidence score, which can then be added to confidence scores of Y's sub-components.

By using dependency trees, an administrator or other user can use the tree to drill down and identify problems more specifically. For example, at the highest level, a storage service 805 may be rated at 80%. Drilling down into the score, the user may find out that the software 805 is at 100% while the hardware 810 is at 60%. Drilling further down, the user may see that the storage servers are at 100% while the network devices are at 20%. Such a dependency tree can make apparent to the user that the problem with the service is due to problems with the network devices. The user can concentrate remediation steps based on the network devices.

In some embodiments, the system 100 may also use the dependency tree to automatically initiate testing and/or remediation. In the example above, the system 100 can use the dependency tree to identity the network devices 830 as problematic and initiate further testing or remediation steps for the network devices associated with the storage service.

Additional Embodiments

Many variations of the asset health monitoring system 100 are possible. For example, while the above implementations have generally described confidence scores in terms of numerical values, with higher values representing higher confidence, other implementations of the confidence score are possible. For example, confidence scores could be represented using negative numbers, with lower values representing higher confidence, or as a percentage chance of failure. In some embodiments, the confidence scores are represented by or can include integers, vectors, arrays, other numerical values, letter grades, logical states, or any other value or quantification. For example, confidence scores or indicators could be represented as a set of logical states within a finite state machine (or similar flow chart schematic) where changes to confidence scores or indicators are state transitions. State transitions may have more than two other target states depending on the detected failure type. Transitions from a source state to a new state can then trigger actions by the system 100 based on the value of the new state (e.g., "new", "healthy", etc.). Some example logical states can include states representing new assets, healthy assets, degraded assets, lemon assets or the like. It will be apparent from the above disclosure that the asset health monitoring system 100 can be adapted to utilize those different implementations. For example, for a particular action, the asset health monitoring system 100 can check that a confidence score is below a target threshold or in a particular state rather than above the target threshold. Other actions described above can also be inverted to account for particular confidence score implementations.

As described above, the asset health monitoring system 100 can be implemented with one or more physical servers or other computing machines, such as several computing machines interconnected via a network. Thus, each of the components depicted in the asset health monitoring system 100 can include hardware and/or software for performing various features. In one embodiment, the asset health monitoring system 100 is implemented on a computing system that hosts a web site or collection of web sites that the system 100 monitors.

The asset health monitoring system 100 can include one or more servers for receiving and responding to network requests from the customer systems 165. The one or more servers can include web servers, application servers, database servers, combinations of the same, or the like. In some embodiments, the network 105 is a publicly accessible network of linked networks, possibly operated by various distinct parties, such as the Internet. In other embodiments, the network 105 may be a private network, such as, for example, a corporate or university network that is wholly or partially inaccessible to non-privileged users. In still other embodiments, the network 105 may include one or more private networks with access to and/or from the Internet.

The processing of the various components of the asset health monitoring system 100 can be distributed across multiple machines, networks, and other computing resources. The various components of the asset health monitoring system 100 can also be implemented in one or more virtual machines, rather than in dedicated servers. Likewise, data repositories can include represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the asset health monitoring system 100 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

Other types of interactions (additionally or alternatively) between the asset health monitoring system 100 and the customer systems are possible in addition to those described above. For example, an asset health monitoring system 100 interaction can be received directly from a user (e.g., via an interactive console, web browser, or other GUI provided by the asset health monitoring system 100) or from an executing program, such as one on a customer computing system 165. In some embodiments, users may interact with the asset health monitoring system 100 using other types of interfaces and in other ways.

In some embodiments, the asset health monitoring system 100 and its components are executed or embodied by one or more physical or virtual computing systems. For example, in some embodiments, a server computing system that has components including a central processing unit (CPU), input/output (I/O) components, storage, and memory may be used to execute some or all of the components of the asset health monitoring system 100. The I/O components can include a display, a network connection to the network 105, a computer-readable media drive, and other I/O devices (e.g., a keyboard, a mouse, speakers, etc.). In some embodiments, the asset health monitoring system 100 may be configured differently than described above.

An embodiment of the asset health monitoring system 100 can be stored as one or more executable program modules in the memory of the server and/or on other types of non-transitory computer-readable storage media, and the asset health monitoring system 100 can interact with computing assets over the network 105. In one embodiment, the asset health monitoring system 100 may have additional components or fewer components than described above. For example, the asset health monitoring system 100 may be built on top of existing software development or testing systems and designed to coordinate the actions of the existing systems.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, act, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A method for tracking computing service health, the method comprising:
   by an asset health monitoring system comprising a hardware processor and memory:
      assigning a confidence indicator to a computing service of a data center;
      selecting a first test to run against the computing service, wherein the selected first test is associated with a type of service provided by the computing service and is assigned a first weight;
      selecting a second test to run against the computing service, wherein the selected second test is not associated with the type of service provided by the computing service and is assigned a second weight less than the first weight;
      obtaining first test results from the first test;
      obtaining second test results from the second test;
      modifying the confidence indicator of the computing service by a first value based at least partly on the first weight assigned to the first test and the first test results; and
      modifying the confidence indicator of the computing service by a second value based at least partly on the second weight assigned to the second test and the second test results.

2. The method of claim 1, further comprising:
   determining whether the modified confidence indicator meets a threshold value; and
   initiating a remediation procedure on the computing service in response to a determination that the modified confidence indicator does not meet the threshold value.

3. The method of claim 2, further comprising assigning a new computing asset to the computing service in response to the determination that the modified confidence indicator does not meet the threshold value.

4. The method of claim 1, further comprising:
   reducing the modified confidence indicator of the computing service based at least partly on a passage of time;
   determining whether the reduced confidence indicator meets a threshold value; and
   initiating a remediation procedure on the computing service in response to a determination that the reduced confidence indicator does not meet the threshold value.

5. The method of claim 1, wherein a plurality of computing assets are associated with the computing service.

6. The method of claim 5, wherein each computing asset in the plurality of computing assets is associated with an asset confidence indicator, and wherein the confidence indicator comprises an aggregation of the asset confidence indicators.

7. The method of claim 5, further comprising allocating one or more of the computing assets in the plurality of computing assets to users of the data center based at least partly on the asset confidence indicator of respective computing assets.

8. A system for monitoring computing service health, the system comprising:
   a confidence indicator generator configured to assign confidence indicators to each of a plurality of computing services;
   computer data storage configured to store the confidence indicators for the computing services; and
   a service testing coordinator comprising computer hardware and in communication with the computer data storage, the service testing coordinator configured to:

initiate a first test of a first computing service in the plurality of computing services, wherein the first test is associated with a type of service provided by the computing service and is assigned a first weight, and initiate a second test of the first computing service in the plurality of computing services, wherein the second test is not associated with the type of service provided by the computing service and is assigned a second weight, wherein the confidence indicator generator is further configured to modify a confidence indicator assigned to the first computing service by a first value based at least partly on the first weight assigned to the first test and results of the first test, and wherein the confidence indicator generator is further configured to modify the confidence indicator by a second value based at least partly on the second weight assigned to the second test and results of the second test.

9. The system of claim 8, wherein the service testing coordinator is further configured to:
determine whether the modified confidence indicator meets a threshold value; and
initiate a remediation procedure on the computing service in response to a determination that the modified confidence indicator does not meet the threshold value.

10. The system of claim 9, further comprising an asset placement coordinator configured to assign a new computing asset to the computing service in response to the determination that the modified confidence indicator does not meet the threshold value.

11. The system of claim 8, wherein the confidence indicator generator is further configured to reduce the confidence indicator based at least partly on a passage of time, and wherein the service testing coordinator is further configured to:
determine whether the modified confidence indicator meets a threshold value; and
initiate a remediation procedure on the computing service in response to a determination that the modified confidence indicator does not meet the threshold value.

12. The system of claim 8, wherein a plurality of computing assets are associated with the first computing service.

13. The system of claim 12, wherein each computing asset in the plurality of computing assets is associated with an asset confidence indicator, and wherein the confidence indicator comprises an aggregation of the asset confidence indicators.

14. The system of claim 12, further comprising an asset placement coordinator configured to allocate one or more of the computing assets in the plurality of computing assets to users of a data center based at least partly on the asset confidence indicators.

15. A non-transitory computer storage medium having stored thereon instructions that, when executed by a computer system, cause the computer system to:
generate a confidence indicator for a computing service of a data center;
initiate a first test of the computing service, wherein the first test is associated with a type of service provided by the computing service and is assigned a first weight;
initiate a second test of the computing service, wherein the second test is not associated with the type of service provided by the computing service and is assigned a second weight less than the first weight;
modify the confidence indicator assigned to the computing service by a first value based at least partly on the first weight assigned to the first test and results of the first test; and
modify the confidence indicator assigned to the computing service by a second value based at least partly on the second weight assigned to the second test and results of the second test.

16. The non-transitory computer storage medium of claim 15, wherein the instructions further cause the computing system to:
determine whether the modified confidence indicator meets a threshold value; and
initiate a remediation procedure on the computing service in response to a determination that the modified confidence indicator does not meet the threshold value.

17. The non-transitory computer storage medium of claim 16, wherein the instructions further cause the computing system to assign a new computing asset to the computing service in response to the determination that the modified confidence indicator does not meet the threshold value.

18. The non-transitory computer storage medium of claim 15, wherein the instructions further cause the computing system to:
reduce the modified confidence indicator of the computing service based at least partly on a passage of time;
determine whether the reduced confidence indicator meets a threshold value; and
initiate a remediation procedure on the computing service in response to a determination that the reduced confidence indicator does not meet the threshold value.

19. The non-transitory computer storage medium of claim 15, wherein a plurality of computing assets are associated with the computing service.

20. The non-transitory computer storage medium of claim 19, wherein each computing asset in the plurality of computing assets is associated with an asset confidence indicator, and wherein the confidence indicator comprises an aggregation of the asset confidence indicators.

* * * * *